United States Patent [19]

Tamoto et al.

[11] 4,206,465
[45] Jun. 3, 1980

[54] PHOTOGRAPHICALLY RECORDING APPARATUS

[75] Inventors: Yusaku Tamoto, Tokyo; Hiroshi Isaka, Tama; Takashi Saitoh, Tokyo, all of Japan

[73] Assignee: Konishiroku Photo Industry Co., Ltd., Tokyo, Japan

[21] Appl. No.: 875,557

[22] Filed: Feb. 6, 1978

[30] Foreign Application Priority Data

Feb. 8, 1977 [JP] Japan .................................. 52-12624
Feb. 8, 1977 [JP] Japan .................................. 52-12625

[51] Int. Cl.$^2$ ......................... G01D 9/42; G03B 1/00; B65G 59/00; B65H 3/08
[52] U.S. Cl. ................. 346/107 R; 346/134; 354/123; 271/107; 414/121
[58] Field of Search ............. 346/33 ME, 110 R, 134; 354/120, 123; 214/1 S, 8.5 D; 271/11, 12, 107

[56] References Cited

U.S. PATENT DOCUMENTS

| 3,265,383 | 8/1966 | Shute | 271/107 UX |
|---|---|---|---|
| 3,370,845 | 2/1968 | Newcomb | 271/107 |
| 3,703,135 | 11/1972 | Lang | 354/120 |
| 3,951,545 | 4/1976 | Lucht | 355/46 |
| 4,003,651 | 1/1977 | Hashida et al. | 346/110 R X |
| 4,080,058 | 3/1978 | Stephany et al. | 355/20 |

FOREIGN PATENT DOCUMENTS

1447969  11/1969  Fed. Rep. of Germany ............. 355/20

Primary Examiner—George H. Miller, Jr.
Attorney, Agent, or Firm—Martin A. Farber

[57] ABSTRACT

A photographically recording apparatus comprising means for storing a plurality of photosensitive sheets, exposure means including a support means for supporting one of the photosensitive sheets, optical means for projecting an image to be recorded on the supported sheet, sheet feed means for supplying the photosensitive sheets stored in the storing means to the support means one by one, the sheet feed means comprising a movable vacuum head for lifting a top sheet of the photosensitive sheets stored in the storing means. A pair of rollers receives the top sheet and a leading edge thereof lifted by the vacuum head, for carrying the top sheet to the support means. A reversible motor drives the driving roller. Control means controls the motor so that the driving roller is rotated in reverse for a certain time when the vacuum head lifts the top sheet stored in the storing means to cause a leading edge of the top sheet to abut upon the driving roller and thereafter for driving the driving roller forwardly.

7 Claims, 12 Drawing Figures

PHOTOGRAPHICALLY RECORDING APPARATUS

BACKGROUND OF THE INVENTION

This invention relates to a photographically recording apparatus for recording pictures displayed on a cathode ray tube, more particularly photographic apparatus for use in computerized tomography system.

Recently, computerized tomography in which tomographic images of X-ray irradiation of a human body are obtained by computer calculation has been developed and practised. The apparatus of this invention is used for recording the output of computerized tomography system, which output is displayed on a monitoring cathode ray tube. One of merits of the computerized tomography system is that vast information is obtained through only one examination. For example, in a medical examination of a head, X-ray images which are formed by X-ray irradiation at any angular position around 360° can be obtained. In order to effectively apply such vast information for medical purposes, it will be apparently insufficient that only one photograph is obtained per one examination. Therefore, several photographs are desired per one examination. Moreover, such photographs must be speedily taken because the computerized tomography system puts out vast information at high rate. In prior art, images on the cathode ray tube are recorded with use of a hand camera wherein one image is recorded on one sheet of photo sensitive material. Such a recording system is inconvenient in that the photographing process is poor in operative efficiency and troublesome in ordering records.

BRIEF SUMMARY OF THE INVENTION

An object of this invention is to provide recording apparatus for use in the computerized tomography system free from the above-mentioned defects. Another object of this invention is to provide apparatus capable of photographically recording several images on one sheet of photosensitive material.

In accordance with this invention, the above-mentioned objects are attained by a photographically recording apparatus comprising means for storing a plurality of photosensitive sheets, exposure means including a support means for supporting one of the photosensitive sheets, optical means for protecting an image to be recorded on the supported sheet, sheet feed means for supplying the photosensitive sheets stored in the storing means to the support means one by one, the sheet feed means comprising a movable vacuum head for lifting a top sheet of the photosensitive sheets stored in the storing means. A pair of rollers receives the top sheet and a leading edge thereof lifted by the vacuum head, for carrying the top sheet to the support means. A reversible motor drives the driving roller. Control means controls the motor so that the driving roller is rotated in reverse for a certain time when the vacuum head lifts the top sheet stored in the storing means to cause a leading edge of the top sheet to abut upon the driving roller and thereafter for driving the driving roller forwardly.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
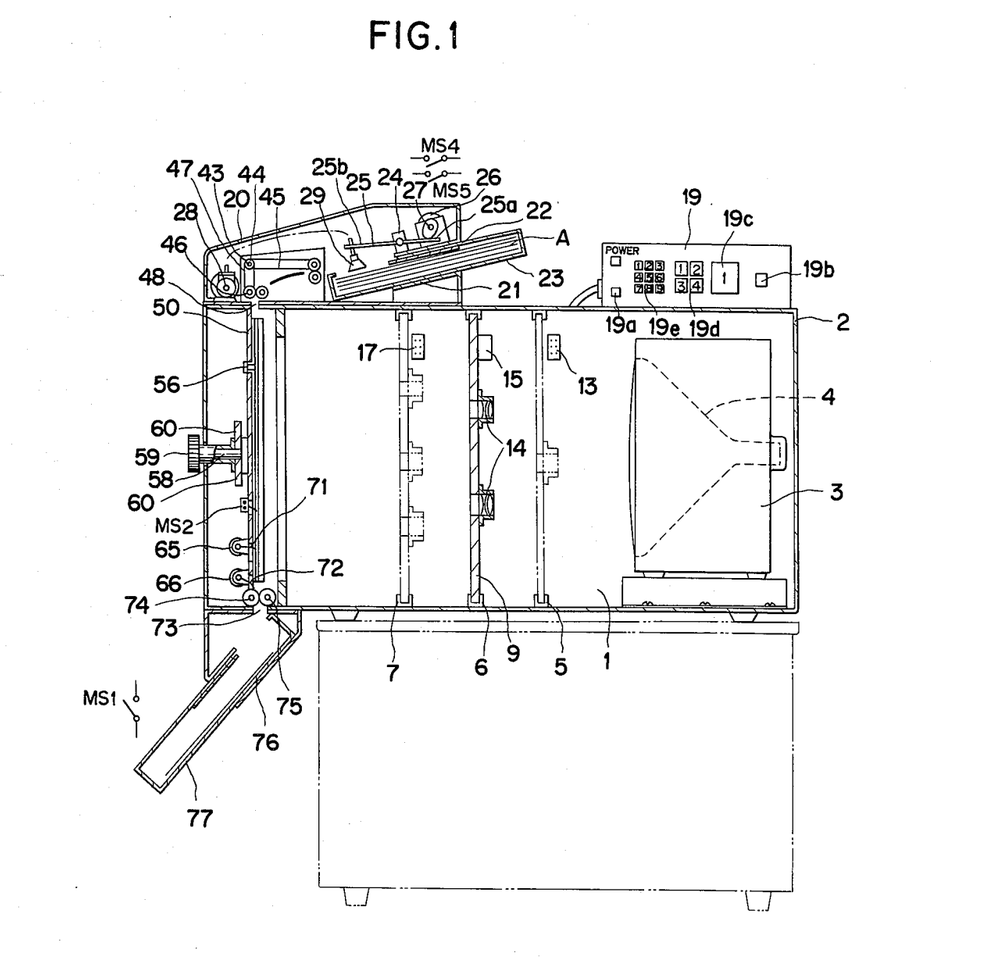
FIG. 1 is a sectional view of an embodiment of this invention.
Figure 2:
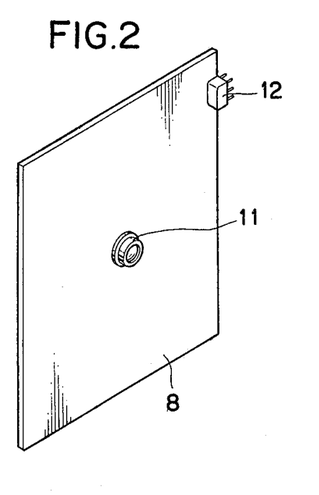
FIGS. 2 to 4 are perspective views of lens-bearing plates used in the embodiment.

In FIG. 1, a photographically recording apparatus is shown, in which images displayed in the apparatus are respectively recorded on divided portions of a photosensitive sheet. The apparatus has an elongated housing 2 which provides a dark room 1. A monitoring television 3 positioned within the housing 2 is connected to a computer (not shown) to receive image information therefrom and displays X-ray tomographic images on a cathode ray tube (CRT) 4. Guide rails 5, 6 and 7 are mounted on a bottom part of the housing 2 approximately parallel with the displaying face of the CRT 4. Lens bearing plates 8, 9 and 10 are respectively mounted within the housing 2 by inserting them along the guide rails.

Figure 3:
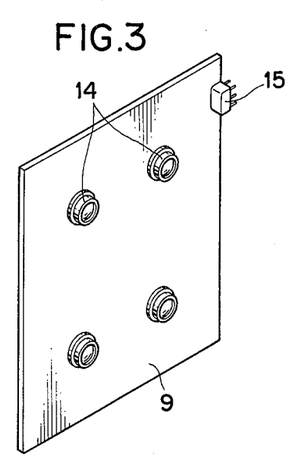
Figure 4:
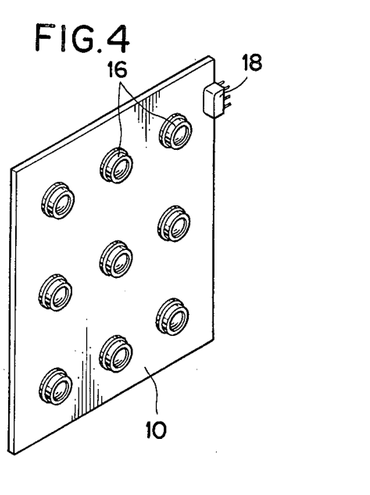

Each of the lens bearing plates corresponds to each of the guide rails. That is, the plate 8 corresponds to the guide rail 5, the plate 9 to the guide rail 6, and the plate 10 to the guide rail 7. The lens plate 8 has a projection member comprising a projection lens 11 an electromagnetic shutter and a connecting plug 12 which is connected to the electromagnetic shutter. The connecting plug 12 is also connected to a socket 13 provided on the housing 2 when the lens plate 8 is fittedly inserted along the guide rail 5. The socket 13 is in turn connected to a control circuit for the electromagnetic shutter, which circuit will be explained later. The circuit is also provided with a fail safe means for monitoring whether the lens plate is correctly positioned. The socket 13 functions as a switch for such monitoring. The lens plate 9 shown in FIG. 3 is provided with four lenses 14 and electromagnetic shutters corresponding thereto. A connecting plug 15 on the lens plate 9 is connected to another socket. Each of the shutters is sequentially operated by the control circuit whereby four images are respectively recorded on four parts of a photosensitive sheet. The lens plate 10 shown in FIG. 4 is provided with nine lenses whereby nine images are recorded on a photosensitive sheet. A connecting plug 18 is connected to a socket 17. The sockets 13 and 17 are respectively connected to the control circuit in a control box 19.

Figure 5:
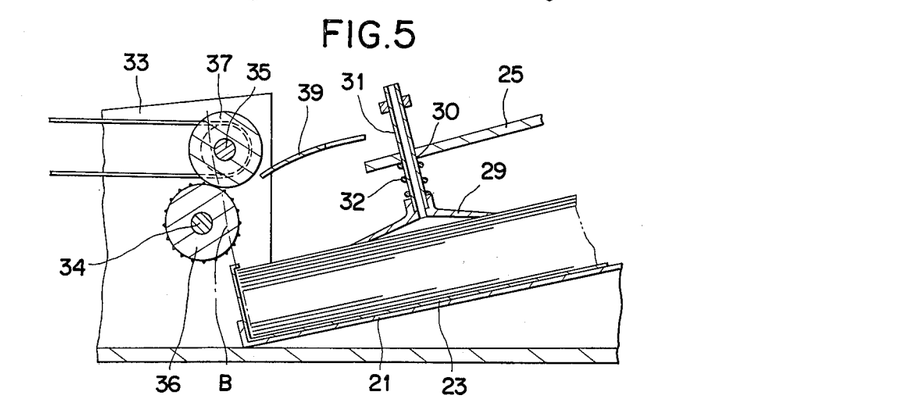
FIG. 5 is an enlarged sectional view of the main part of a sheet feed mechanism of the embodiment.
Figure 6:
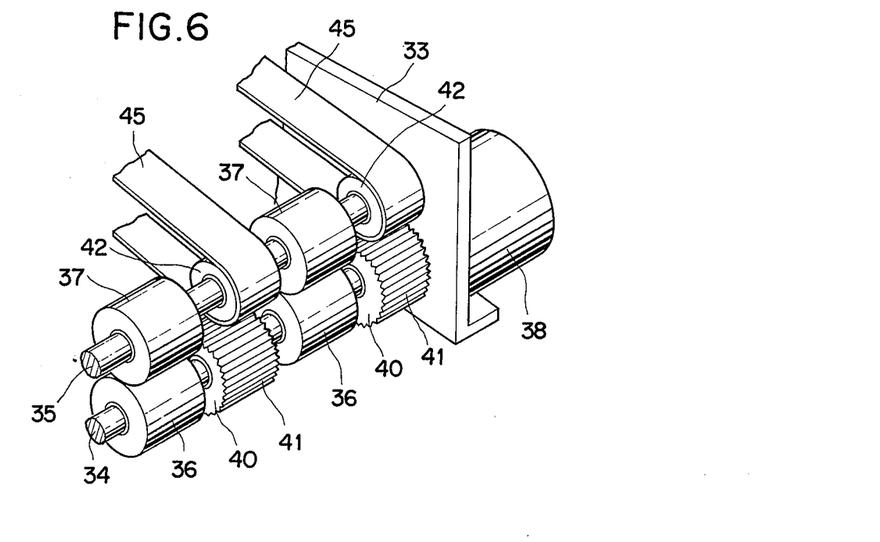
FIG. 6 is an enlarged perspective view of the main part.
Figure 8:
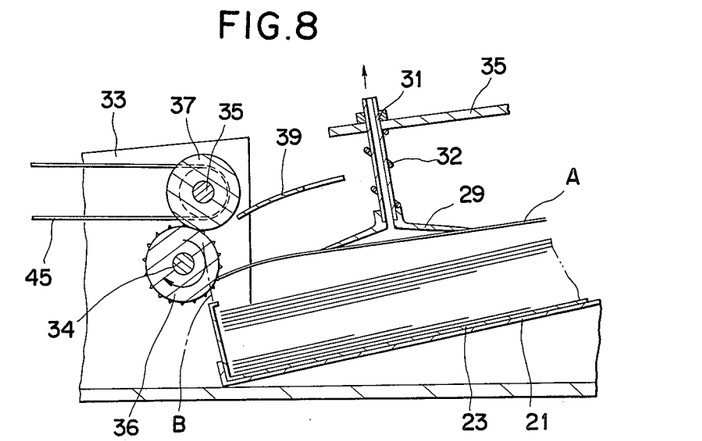
FIGS. 8 to 10 show different active stages of the sheet feed mechanism.
Figure 9:
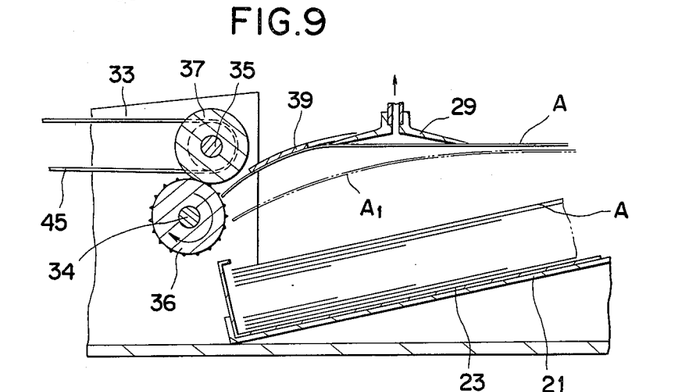

Again referring to FIG. 1, another housing 20 is mounted on the housing 2, which housing forms a light tight room for a plurality of photosensitive sheets with cooperation of a sheet magazine 23 which is supported by a plate 21. The sheet magazine contains a plurality of photosensitive sheets A. On the plate 21, micro switches MC4 and MC5 are mounted as diagramatically shown in FIG. 1. ON or OFF of these micro switches serves to discriminate sorts of the sheets contained in the magazine. In the housing 20, a sheet feed mechanism which is illustrated in detail in FIGS. 5 and 6 is provided. The sheet feed mechanism comprises an oscillating arm 25 which is mounted to a plate 24. An end 25a of the arm 25 follows a cam 27 which is connected to a shaft of a motor 26. The other end 25b of the arm 25 supports a vacuum head 29 which is operatively connected to a vacuum pump 28 which is arranged within the housing 20. The vacuum head 29 is pivotally mounted to a bottom end of a tube 31, which is pivotally mounted in a hole 30 provided in the arm 25. The head 29 is downwardly urged by a helical spring 32. The sheet feed mechanism has a frame 33. Support shafts 34 and 35 are mounted to the frame and in turn support pairs of rollers 36 and 37. The rollers 36 and 37 are arranged so that these rollers feed the photosensitive sheets one by one. Detailedly explaining this mechanism, a reversible motor 38 drives the shaft 34 as well as rollers 36. Photosensitive sheet A carried by the vacuum head 29 is brought to the rollers 36 with a moving locus designated by B in FIG. 5. The rollers 37 are positioned to sufficiently prevent the elevation of the leading end of the sheet when the sheet is lifted by the vacuum head 29. That is, the rollers 37 are located in, such position that the axes of the rollers 37 resides at the right side of the locus B in FIG. 5. An abutment plate 39 is fixed to a stationary part of the sheet feed mechanism to prevent over-elevation of the leading end. The photosensitive sheets are fed one by one without any error by the above-mentioned mechanism. When by the vacuum head 29, the leading edge of the sheet firstly abuts upon the rollers 36 and is bent thereby, and then when the vacuum head 29 further goes up, the leading edge comes out of the rollers 36 by its own resiliency and abuts upon the rollers 37. Even if two or more sheets are carried by the vacuum head 29 due to high humidity or other tackiness, the sheets are separated by the bending. The sheet or sheets separated from the sheet directly attached to the vacuum head 29 drops toward the magazine 23, when the sheet or sheets is bent by the rollers 36 as well as 37. The sheet feed mechanism is further provided with a mechanism for separating sheets which are erroneously carried by the vacuum head 29. The shaft 34 integrally supports rollers 40 which are respectively interposed between the rollers 36. It can be said that the rollers 36 have the same configuration as that of the rollers 40. The rollers 40 have a diameter slightly larger than those of the rollers 36 and are of metal. The rollers 40 have rugged surfaces. When the leading edge of the photosensitive sheet is brought by the vacuum head 29 to abut upon the rugged surfaces of the rollers 40, if the rollers 40 are rotated at reverse directions by the reversible motor 38 as shown in FIGS. 8 and 9, the rugged surfaces of the rollers 40 downwardly urge the leading edge against the lifting force of the vacuum head 29, so that only a top sheet which is directly carried by the vacuum head 29 is held and the other sheet A1 or sheets which is erroneously lifted is dropped.

Figure 7:
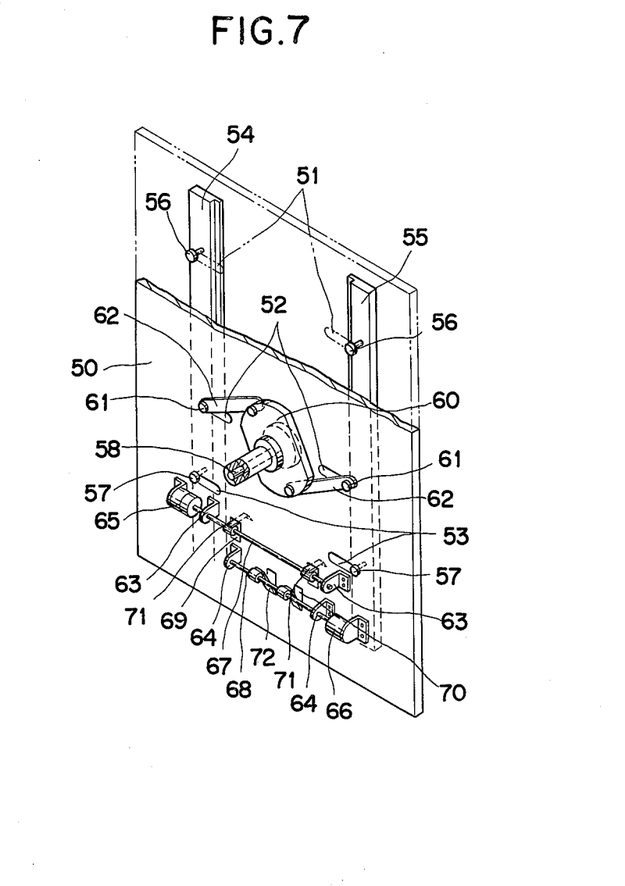
FIG. 7 is a perspective view of a part of the embodiment constituting an exposure station.
Figure 10:
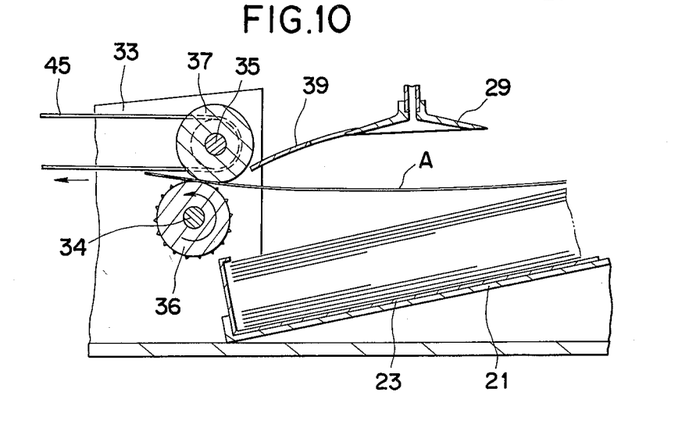

The shaft 35 rotatably supports pulleys 42 which support in turn belts 45. The belts 45 are supported at the other end by rollers 43. On the rollers 43 and rollers 46, belts 47 are suspended. The rollers 46 are driven by a motor (not shown) to advance the photosensitive sheet. When the rollers 36 rotate at a direction of the arrow in FIG. 10, the photosensitive sheet is advanced and then further advanced by belts 45 and 47 to a channel 48. The rollers 46 downwardly advance the photosensitive sheets A. An exposure stage is provided just below the channel 48. FIG. 7 is a perspective view of the exposure stage. A plate 50 mainly constitutes the exposure stage. In the plate 50, horizontal elongated holes 51, 52 and 53 are provided and guide members 54 and 55 are supported. A post 58 is rotatably mounted on the plate 50. The post 58 is integral with a handle 59 as well as a plate 60. The guide members 54 and 55 are respectively connected to the plate 60 through pins 61 and links 62. Two pairs of brackets 63 and 64 are mounted on the lower part of the plate 50. A pair of brackets 63 is arranged horizontally and a pair of brackets 64 arranged samely. These pairs of brackets rotatably support shafts 67 and 68. The shaft 67 is driven by a rotary solenoid 65 and the shaft 68 by a rotary solenoid 66. A stopper 71 which is positioned on the exposure stage side of the plate 50 is integrally mounted to the shaft 67 through the hole 69. Samely, a stopper 72 is integrally mounted to the shaft 68. As explained later, either of the stoppers 71 and 72 is brought into its operative position when the guide members 54 and 55 are displaced. The micro switch MS4 and MS5 serve to such the change operation. That is, when the guide members 54 and 55 are displaced to such position that the distance between these guide members is relatively large to guide large size sheets. The micro switch MS4 is turned on to energize the solenoid 66. Thus, the stopper 72 is displaced to its operative position. Similarly, the stopper 71 is, displaced to its operative position when the guide members 54 and 55 are displaced to define a relatively narrow path for the photosensitive sheets. The photosensitive sheet A dropped from the channel 48 is supported by either of the stopper 71 and 72 and hence held at exposure position. After exposure, the photosensitive sheet A is advanced by rollers 74 and 75 which are arranged above the discharge channel 73. Under the housing 2, a member 76 is attached to receive a magazine 77. The discharged photosensitive sheets are received by the magazine 77. A micro switch MS1 is provided to detect the atachment of the magazine 77 to the receiver member 76. This switch serves to prevent erroneous operation of the apparatus due to incorrect attachment of the magazine 77 to the housing 2.

It can be said that an automatic photographic processing system is connected to the magazine 77 at the receive member 76. If the automatic processing system is connected, all of exposure, developing and fixing processes are automatically and continuously carried out, so that the recording process of the output of the computerized tomography system is performed at extremely high speed.

Figure 11:
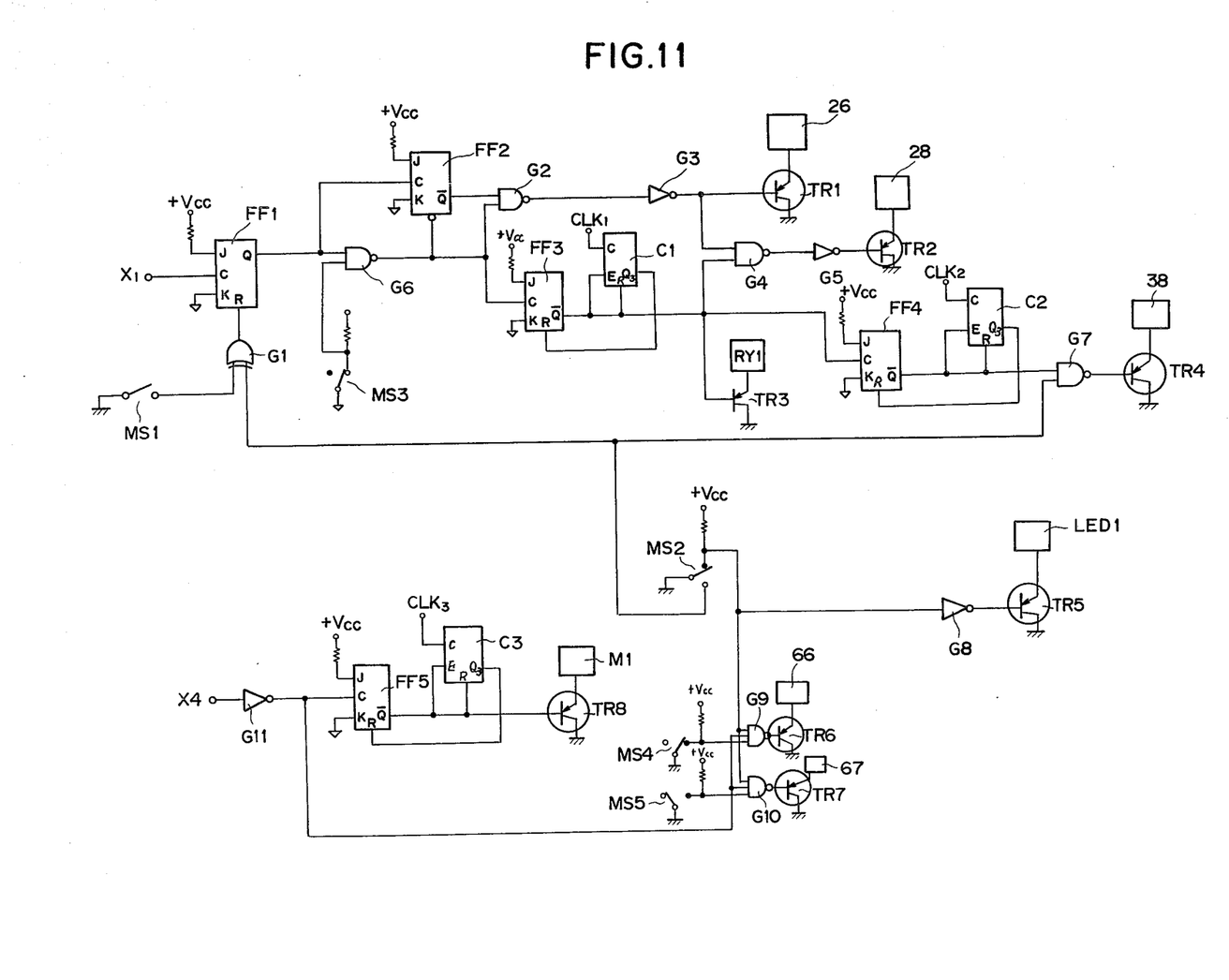
FIG. 11 is a control circuit for the sheet feed mechanism.

FIG. 11 shows a control circuit which is incorporated in the control box 19. When a button switch 19a on a control panel is actuated, the photosensitive sheets A in the magazine 23 are fed one by one to the exposure stations. After exposure, the sheet is discharged from the apparatus. The control circuit shown in FIG. 11 effects such operation.

In FIG. 11, signals from the button switch 19a are adapted to a terminal X1, and introduced to a J-K flip-flop FF1 as clock input. The flip-flop FF1 with a J terminal held at +V volt and a K terminal grounded are set by the signal from the X1. To the reset terminal of the flip-flop FF1, the output of an exclusive OR gate G1 is connected to reset the flip-flop FF1 with logic "1". One input of the gate G1 receives signals from the micro switch MS1, (shown in FIG. 1) which detects the insertion of the magazine 77. The other input of the gate G1 receives signals from the micro switch MS2 which detects a photosensitive sheet correctly located on the exposure stage. At the initial stage even if the magazine 77 is correctly set the flip-flop FF1 remains at its settable state since the photosensitive sheet does not exist on the exposure stage and hence the output of the gate G1 is "0". When one pulse is inputted through the terminal X1 to the flip-flop FF1, the flip-flop is set, whereby the output Q of the flip-flop becomes "0". The output "0" Of $\bar{Q}$ turns on a transistor TR1 through a NAND gate G2 and an inverter G3. The transistor TR1 is a member of a drive circuit of the motor 26 which is driven when the transistor TR1 is turned on. Accordingly, when the transistor TR1 is turned on, the vacuum head 29 is moved by the motor 26. the output $\bar{Q}$ of a flip-flop FF2 turns on a transistor TR2 through a NAND gate G4 and an inverter G5 when this output $\bar{Q}$ become "0". The ON operation of the transistor TR2 energize the vacuum pump 28. A micro switch MS3 detects the vacuum head 29 displaced to its uppermost position. Concretely, the switch MS3 is actuated by the oscillating arm 25 displaced to its uppermost position. The vacuum head 29 is located at its uppermost position in the initial stage and when the sheet supply operation has been finished. Therefore, the micro switch MS3 is held at the state shown in FIG. 11 at the initial stage and is changed substantially at the same time as the motor 26 initiates rotation. A NAND gate G6 is opened by this change operation and hence the flip-flop FF2 is reset. Even if the flip-flop FF2 is reset, since one input of the gate G2, i.e.; the output of the gate G6 is "0", the output of the gate G2 does not change. Therefore, the motor 26 and vacuum pump 28 continue to operate. The uppermost one of the photosensitive sheets is lifted by the vacuum head 29. When the vacuum head 29 reaches its uppermost position, the micro switch MS3 is again changed to the state shown in FIG. 11. By this change, the output of the gate G2 changes to "0" and the transistor TR1 is turned off. Therefore, the motor 26 stops and hence the vacuum head 29 stops at its uppermost position. The output "1" of the gate G6 also sets a flip-flop FF3. By this setting, the output of a NAND gate G4 is held at "1". Therefore, even when the vacuum head 29 is stopped, the vacuum pump 28 continues to operate, so that the photosensitive sheet is held by the vacuum head 29. On the other hand, the set of the flip-flop FF3 releases the resetting of a counter C1. By this release, the counter C1 initiates counting clock pulses. When the counter C1 counts a certain number, the output of the counter C1 resets the flip-flop FF3. The flip-flop FF3 and the counter C1 constitute a time delay circuit. The time interval from the setting to the resetting of the flip-flop FF3 gives a delayed time. During this time interval, the photosensitive sheet is held at its uppermost position by the vacuum head 29. As explained with reference to FIGS. 8 and 9, such a holding serves to separate an erroneously lifted sheet or sheets. In order to enhance this separation, a reversible motor 38 is provided. A transistor TR3 is turned on during the time interval by the output of the set flip-flop FF3 and thereby a relay RY1 is energized to reverse the direction of the rotation of the motor 38. When the flip-flop FF3 is reset, the output of the gate G4 becomes "0" to stop the vacuum pump 28 whereby the held sheet is released. The resetting of the flip-flop FF3 also sets a flip-flop FF4. The flip-flop FF4 and a counter C2 also constitute a time delay circuit to give another delayed time interval. During this time interval, a transistor TR4 is turned off with "1" output of a NAND gate G7. This time interval is provided with such aim that transient duration while the motor 38 is changed from its forward rotation to reverse rotation is required. By resetting of the flip-flop FF4 the output of the gate G7 again becomes "0" and hence the motor 38 initiates forward rotation. When the photosensitive sheet has reached the exposure station, a micro switch MS2 is changed from the state shown in FIG. 11. By this changes, the flip-flop FF1 is reset and thereby the motor 38 is stopped. Thus, the sheet supply process has finished. In this state, the setting of the flip-flop FF1 is inhibited whereby troubles due to erroneous operation of a sheet supply button is prevented.

When the micro switch MS2 is changed as above, a transistor TR5 is turned on with "1" output of an inverter G8 and thereby a light emission element LED1 such as light emission diode is turned on to indicate readiness for image exposure on a panel of the control box 19.

On the other hand, the change of the micro switch MS2 opens a NAND gate G9 or G10. The inputs of these gates G9 and G10 respectively correspond to the micro switch MS4 and MS5. The setting of the guide members 54 and 55 to one of two position gives "1" input to either of the gates G9 and G10. The "0" output of either of the gates G9 and G10 turns on either of transistors TR6 and TR7 whereby the rotary solenoid 65 or 66 is energized to displace either of the stoppers to its operative position.

When exposure process of the photosensitive sheet to image or images displayed on the CRT has been finished, a signal is given to a terminal ×4. By this signal, a gate G9 or G10 is turned to put out "1" with the output "0" of an inverter G11. Thereby the rotary solenoid 65 or 66 is deenergized, so that the photosensitive sheet drops to the discharge rollers 74 and 75. At this time, the flip-flop FF5 is also set by the output of the inverter G11. The flip-flop FF5 and a counter C3 constitute a time delay circuit as the flip-flop FF3 and the counter C1. During a time interval given by this time delay circuit, a transistor TR8 is turned on. This transistor TR8 drives a motor M1 which in turn drives the discharge rollers 74 and 75 whereby the exposed photosensitive sheet is advanced to the magazine 77. When the sheet is discharged, the micro switch MS is changed to the state shown in FIG. 11 whereby the system restores its original state shown in FIG. 11.

Figure 12:
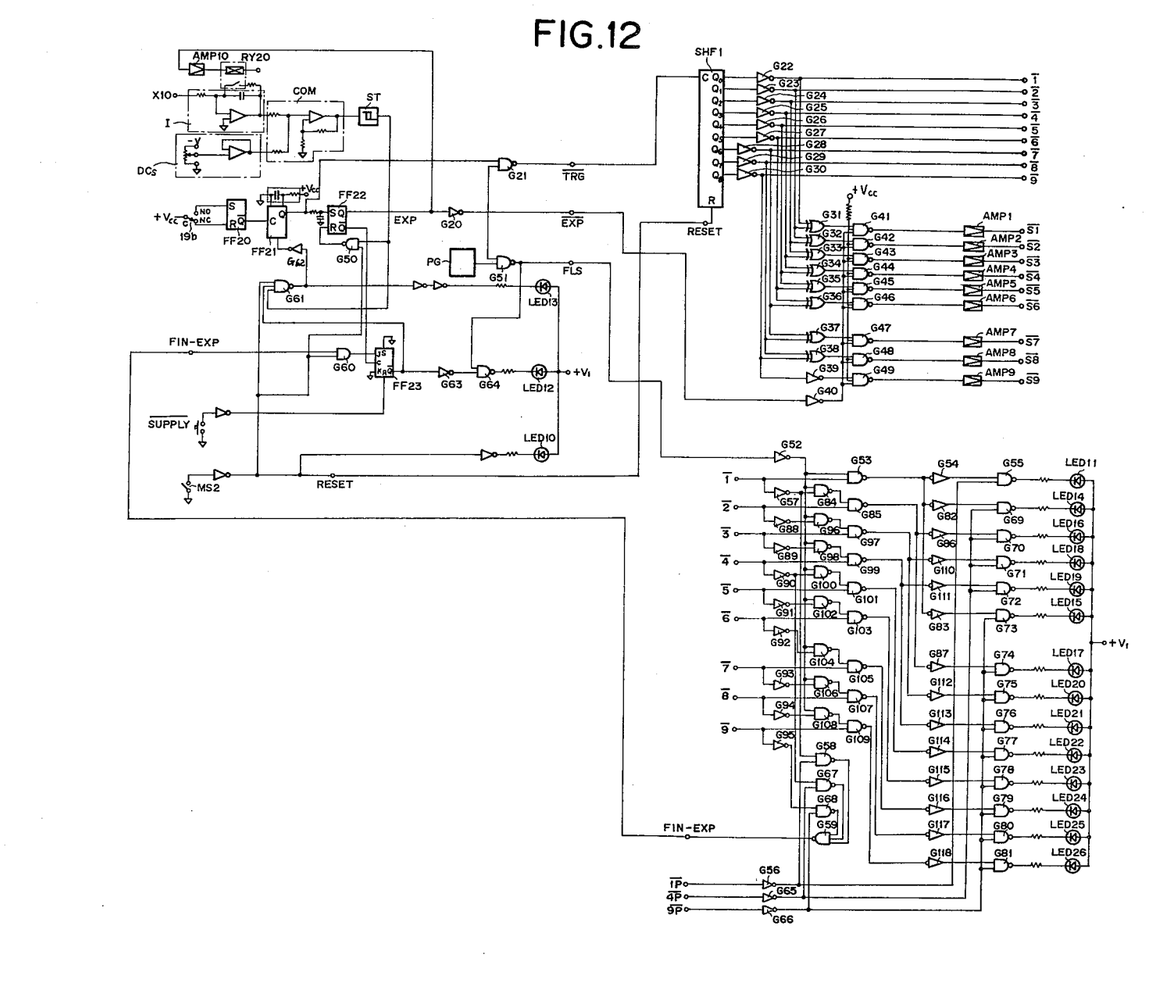
FIG. 12 is a control circuit for a photo-graphing system of the embodiment.

FIG. 12 shows a control circuit for an exposure system, which circuit is incorporated in the control box 19 shown in FIG. 1.

By the actuation of a button swith 19b on the control panel, an image is recorded on one photosensitive sheet. Signals by the actuation of the button switch 19b are given to a flip-flop FF20 to set or reset the flip-flop. The output of the flip-flop is given to a flip-flop FF21. The pulse of the flip-flop FF20 is shaped in wave form by an integral circuit provided together with the flip-flop FF21. A flip-flop FF22 is set by the output of the set flip-flop FF21. The Q output of the flip-flop FF22 gives an exposure command signal $\overline{EXP}$ through an inverter G20 to a shutter control circuit. Preceding to the generation of the signal $\overline{EXP}$, a trigger pulse $\overline{TRG}$ is given to a NAND gate G21 which receives the output of the set flip-flop FF21 and the signal $\overline{EXP}$. The outputs of the gate 21 are used as shifting pulses for a shift-register SHF1. As explained later, the shift-register SHF1 is being reset at the initial state. The outputs $Q_0, Q_1, \ldots Q_8$ of the shift-register SHF1 are sequentially turned as $100\ldots0, 110\ldots0, \ldots$. Signals of the outputs $Q_0$ to $Q_8$ appears on terminals $\bar{1}$ to $\bar{9}$ through inverters G22 to G30. Inverters G22 and G23 are connected to an exclusive OR gate G31. Similarly, pairs of the inverters G23,G30 are respectively to exclusive OR gates G32 to G38. Therefore, output "1" of one of the gates 31 to 38 is obtained when the one receives "0" and "1" signals from a corresponding pair of the gates G22 to G30. An inverter G39 puts out "1" when a signal "0" appears on the terminal $\bar{9}$. The outputs of the gates G31 to G38 and the inverter G39 are respectively given to NAND gates G41 to G49 which are opened by the exposure command signal $\overline{EXP}$ through an inverter G40. The outputs of the gates G41 to G49 are amplified by amplifiers AMP1 to AMP9 to appear on terminals $\bar{S1}$ to $\bar{S9}$. The signals on these terminals drive electromagnetic shutters mounted on the lens bearing plate. Each of the electromagnetic shutters is sequentially driven by the exposure command signal.

The exposure command signal which is given by setting of the flip-flop FF22 energizes a relay RY20 through an amplifier AMP10. The relay RY20 opens a contact of it when energized. An integrator 1 integrates an analogue signal from a terminal X10 when the relay switch is opened. The analogue signal on the terminal X10 represents the luminosity on the CRT. Such an analogue signal can be obtained by any known photometric circuit not shown, for example, that comprising a photoelectric element and amplifiers. The output of the integrator 1 is compared by a comparator COM with a reference given by a reference voltage circuit DCs. The reference can be adjusted in accordance with sensitivity of a used photosensitive sheet. When the photosensitive sheet is exposed to light with a predetermined amount, the comparator COM turns. The turning signal of the comparator is given to the reset terminal of the flip-flop FF22 through a Schmitt trigger circuit ST and a NAND gate 50 to reset the flip-flop. The gate 50 is opened by a signal from the micro switch MS-2 which detects whether the photosensitive sheet has been set at the exposure station or not. The micro switch MS2 also resets the shift-register SHF1 and energize the light emission diode LED10. The "0" output of the flip-flop FF22 which has been reset deenergizes the electromagnetic shutter to finish exposure and also deenergize the relay RY20 to render the output of the integrator 1 to zero.

Thus, one exposure operation is finished. Preceeding to the exposure operation, signals FLS are generated through a NAND gate G51 by pulse generator PG. The FLS signals are applied to gates through an inverter G52. A NAND gate G53 receives a signal at a terminal $\bar{1}$ from the shift-register SHF1 and the signals FLS. Therefore, when the signal at the terminal $\bar{1}$ is "1", the gate G53 is opening for the signal FLS. The signals FLS flicker a light emission diode LED11 through inverters G54 and G55. The flickering light emission diode LED11 indicates a ready state of the system for exposure. The light emission diode LED11 illuminate an indicator 19C on the terminal $\bar{1P}$, which is given by the insertion of the lens bearing plate 8. Therefore, if the lens bearing plate 8 is not inserted, the exposure-ready indication will not be given. When one exposure operation has been finished, the signal at the terminal $\bar{1}$ becomes "0", so that the gate G53 is closed to turn off the light emission diode LED11. "0" signal on the turminal $\bar{1}$ also gives "1" input to a NAND gate G58 through on inverter G57. The signal "0" on the terminal $\bar{1}$ also gives a signal FIN-EXP through the gate G58 and a NAND gate G59 since the gate G58 is opened by the output of the gate 56, which signal represents that the total exposure operation has been finished. The signal FIN-EXP is applied to the terminal X4. The J-terminal of the flip-flop FF23 receives the signal FIN-EXP through an AND gate G60, so that the flip-flop FF23 is set by the Q output of the flip-flop FF22. The output of the flip-flop FF23 which has been set inhibits the setting and resetting of the flip-flop FF21 through a NAND gate G61 an inverter G62 whereby the generation of the exposure command signal is prevented by the signal FIN-EXP. This inhibition is held until the button switch 19a is actuated to reset the flip-flop FF23. In other word, only after a next photosensitive sheet has been fed to the exposure station, exposure operation is made possible, so that double exposure is prevented. This inhibition state is displayed by flickering of a light emission diode LED12 which is driven by signals FLS fed through an AND gate G64 which is opened by the $\bar{Q}$ output with "0" of the flip-flop FF23. An exposure-ready state is displayed by a light emission diode LED13 which is turned on by the "0" output of the gate G61. The gate G61 is controlled by the flip-flop FF23 the micro switch MS2 and the comparator COM. During exposure, the light emission diode LED13 is turned off.

The exposure operation for one photosensitive sheet with one exposure is finished through the above mentioned operation wherein one image is recorded on one photosensitive sheet.

Hereinafter, an exposure operation will be explained, wherein four or nine images are recorded on one photosensitive sheet. In this operation, the lens bearing plate 9 or 10 respectively shown in FIG. 3 or 4 is inserted into the housing 2. When the lens bearing plate 9 is inserted, a signal "0" appears on a terminal $\overline{4P}$ and when the lens bearing plate 10 is inserted, a signal "0" appears on a terminal $\overline{9P}$. A NAND gate G67 or G68 is opened by this operation through an inverter G65 or G66 with "1" output. The output of the gate G65 or G66 also opens NAND gates G69 to G72 or NAND gates G73 to G81. In this state, the shift register SHF1 is reset when a new photosensitive sheet is fed to the exposure station. Therefore, signals of "1" appear on the terminals $\bar{1}$ to $\bar{9}$. The FLS signals are obtained as explained above in this state. Therefore, a light emission diode LED14 or LED15 is turned on by these FLS signals through the NAND gate G69 or G73. The light emission diode LED14 indicates a state ready for the first one of four exposures at an indicator 19d on the control box 19 and the light emission diode 15 a state for the first one of nine exposures at an indicator 19e.

In this ready state, if an exposure command signal is given, a first exposure is conducted as explained above. In the four or nine image-exposure operation, the signal FIN-EXP is not generated even when the first exposure has been finished. First, the shift-register SHF1 is turned to "0" at the terminal $\bar{1}$, so that the gate G53 is closed to turn the output of the inverter G57 to "1". Therefore, the light emission diode LED14 or LED15 is turned off as well as the FLS signals are given to a NAND gate G85 through a NAND gate G84. The output of the gate 85 is given to a NAND gate G70 or G74 respectively through an inverter G86 or G87. A light emission diode LED16 or 17 is turned on because the gate G70 or G74 is opened. The light emission diode LED16 illuminates the indicator 19d with a character "2" on the control box 19. The light emission diode LED17 illuminates the indicator with a character "2".

Thus, drive signals sequentially appear on the terminals $\overline{S1}$ to $\overline{S4}$ or $\overline{S1}$ to $\overline{S9}$ per exposure, so that each of the electromagnetic shutters is sequentially driven to effect sequential exposure and at the same time the exposure indication is displayed at the indicator 19d or 19e on the control box 19 with visualization of a character corresponding to a portion of the photosensitive sheet being exposed. Inverters G88 to G95, NAND gates G96 to G109, inverters G110 to G118 and light emission diodes LED18 to LED26 are elements for similar indication operation to that explained above. When four or nine exposure processes have been finished, the FIN-EXP signal is generated to finished exposure operation as well as to restore the control circuit to its original state. Moreover, it will be understood that a six image-exposure operation is carried out similarly. Although the invention has been described in terms of a preferred inbodiment thereon it should be understood that invention is not limited thereto and that many changes and modifications will be obvious to one skilled in the art without departing from the spirit and scope of the invention as defined in the appended claims.

What is claimed is:

1. A photographically recording apparatus comprising means for storing a plurality of photosenstive sheets,
exposure means including a support means for supporting one of said photosensitive sheets,
optical means for projecting an image to be recorded on the supported sheet,
sheet feed means for supplying said photosensitive sheets stored in the storing means to said support means one by one, said sheet feed means comprising a movable vacuum head for lifting a top sheet of said photosensitive sheets stored in said storing means,
a pair of rollers constituting means for receiving said top sheet and a leading edge thereof lifted by said vacuum head for carrying said top sheet to said support means,
a reversible motor for driving one of said rollers,
control means for controlling said motor so that said one of said rollers is rotated in reverse for a certain time when said vacuum head lifts the top sheet stored in the storing means to cause a leading edge of the top sheet to abut upon said one of said rollers and thereafter for driving said one roller forwardly.

2. The apparatus according to claim 1, further comprising
magazine means for receiving said photosensitive sheet fed from said exposure means after exposing the image from said optical means thereon.

3. The apparatus according to claim 1, wherein said sheet feed means further comprises
stopper means for limiting the elevation of said leading edge over a predetermined level when said vacuum head lifts said top sheet.

4. The apparatus according to claim 3, wherein
said stopper means comprises the other one of said rollers.

5. The apparatus according to claim 3, further comrpising,
photographic processing means for receiving the photosensitive sheet fed from said exposure means after exposing the image from said optical means thereon.

6. The apparatus according to claim 3, wherein
said stopper means comprises a stationary plate.

7. The apparatus according to claim 6, wherein
the other one of said rollers is located in such a position that said leading edge abuts upon said other roller by further lifting of said vacuum head after abutting upon said stationary plate.

* * * * *